US009955331B2

United States Patent
Hrabak et al.

(10) Patent No.: US 9,955,331 B2
(45) Date of Patent: Apr. 24, 2018

(54) METHODS FOR PRIORITIZING AND ROUTING AUDIO SIGNALS BETWEEN CONSUMER ELECTRONIC DEVICES

(71) Applicant: GM GLOBAL TECHNOLOGY OPERATIONS LLC, Detroit, MI (US)

(72) Inventors: Robert A Hrabak, West Bloomfield, MI (US); Matthew G. Przybylski, Fenton, MI (US); Paula J. Vandermuss, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 14/299,271

(22) Filed: Jun. 9, 2014

(65) Prior Publication Data

US 2015/0359015 A1    Dec. 10, 2015

(51) Int. Cl.
*H04L 29/08* (2006.01)
*H04W 4/04* (2009.01)
*H04M 1/60* (2006.01)

(52) U.S. Cl.
CPC ............ *H04W 4/48* (2018.02); *H04L 67/141* (2013.01); *H04W 4/80* (2018.02); *H04W 76/10* (2018.02); *H04L 67/12* (2013.01); *H04M 1/6066* (2013.01)

(58) Field of Classification Search
CPC ...... H04L 67/141; H04L 67/12; H04W 4/008; H04W 76/02; H04W 4/04; H04W 4/046; H04W 4/45; H04W 4/80; H04W 76/10
See application file for complete search history.

(56) References Cited

U.S. PATENT DOCUMENTS

| | | | | |
|---|---|---|---|---|
| 2007/0015485 | A1* | 1/2007 | DeBiasio | H04B 1/082 455/345 |
| 2007/0238475 | A1* | 10/2007 | Goedken | H04M 1/7253 455/512 |
| 2009/0207445 | A1* | 8/2009 | Kimura | H04N 1/00307 358/1.15 |
| 2009/0319613 | A1* | 12/2009 | Hjelm | H04L 67/16 709/204 |
| 2009/0327596 | A1* | 12/2009 | Christenson | G06F 13/1684 711/105 |
| 2010/0062848 | A1* | 3/2010 | Ballay | H04N 7/163 463/31 |
| 2011/0250920 | A1* | 10/2011 | Shimizu | H04W 72/1215 455/512 |
| 2012/0087510 | A1* | 4/2012 | Sampimon | H04R 1/1083 381/74 |

(Continued)

*Primary Examiner* — Aaron Strange
(74) *Attorney, Agent, or Firm* — Lorenz & Kopf, LLP (57) ABSTRACT

Methods for prioritizing and routing audio signals between consumer electronic devices using wireless communication standards are provided. In one embodiment, a method for prioritizing and routing audio signals between consumer electronic devices includes receiving a device prioritization designation for at least two connectivity technology-enabled devices. The prioritization designation designates a first of the at least two connectivity technology-enabled devices as having a higher priority than another of the at least two connectivity technology-enabled devices. The method further includes connecting with each of the at least two connectivity technology-enabled devices and providing an audio signal to the first of the at least two connectivity technology-enabled devices.

12 Claims, 6 Drawing Sheets

(56) References Cited

U.S. PATENT DOCUMENTS

| | | | |
|---|---|---|---|
| 2014/0213227 A1* | 7/2014 | Rao | H04W 4/206 455/414.3 |
| 2015/0138045 A1* | 5/2015 | Lee | G06F 3/1454 345/2.2 |
| 2015/0222680 A1* | 8/2015 | Grover | H04L 65/4084 709/204 |

* cited by examiner

METHODS FOR PRIORITIZING AND ROUTING AUDIO SIGNALS BETWEEN CONSUMER ELECTRONIC DEVICES

TECHNICAL FIELD

The technical field generally relates to generally to wired or wireless communication between consumer electronics devices. More particularly, the technical field relates to the use of the Bluetooth, USB, and Wi-Fi standards for connecting, or establishing secure communications between, two or more consumer electronics devices—including in-vehicle systems, mobile phones, MP3 music players, laptop computers, gaming systems, digital cameras, smart watches, smart glasses and eyepieces, connectible medical devices, and other wearable electronic devices and others.

BACKGROUND

Many modern consumer electronics devices use communication standards, such as the Bluetooth standard or Internet Protocol (IP) standard, for communicating with other such devices. One simple example is a Bluetooth headset for a mobile phone. Once the headset and the mobile phone are "connected"—that is, they have established a communication channel between the two devices—then the user of the mobile phone can operate the phone in a hands-free fashion via the wireless headset. Other examples of Bluetooth-compatible devices include small personal music players which can use Bluetooth to wirelessly play their music over the amplifier and speakers of a larger stereo system, and personal computers which can use Bluetooth to wirelessly connect many types of peripheral devices.

Bluetooth technology, like others, has also become a popular feature in vehicles. Many vehicles now include capability for a driver or occupant to wirelessly connect a personal consumer electronics device with the vehicle's embedded entertainment and communication systems via Bluetooth. One example of this is using a vehicle's microphone and speaker system to operate a driver's mobile phone in a hands-free fashion. Another example is playing music from a small personal music player through a vehicle's stereo sound system. Bluetooth wireless connectivity has gained rapid acceptance for these types of applications and many others.

However, several problems associated with the use of Bluetooth and other connectivity technologies remain unsolved in the art. For example, when a Bluetooth-enabled electronic device, such as the user's mobile phone, is connected to two or more devices, the user may experience confusion when audio is not presented through the expected one of the two or more devices. In the exemplary context of in-vehicle use, a user may enter a vehicle with a mobile phone and a headset, at which point the mobile phone may be connected with both the vehicle and the headset. The user may experience confusion if audio is unexpectedly presented through the headset as opposed to through the vehicle.

SUMMARY

Various methods for prioritizing and routing audio signals between consumer electronic devices using wireless communication standards are provided. In one embodiment, a method for prioritizing and routing audio signals between consumer electronic devices includes receiving a device prioritization designation for at least two Bluetooth-enabled devices. The prioritization designation designates a first of the at least two Bluetooth-enabled devices as having a higher priority than another of the at least two Bluetooth-enabled devices. The method further includes wirelessly connecting with each of the at least two Bluetooth-enabled devices and providing an audio signal to the first of the at least two Bluetooth-enabled devices.

In another exemplary embodiment, a method for prioritizing and routing audio signals between consumer electronic devices includes wirelessly connecting with each of at least two Bluetooth-enabled devices, transmitting to a first of the at least two Bluetooth-enabled devices a listing of the at least two Bluetooth enabled devices, receiving a selection of one of the at least two Bluetooth-enabled devices form the first of the at least two Bluetooth-enabled devices, and providing an audio signal to the selected one of the at least two Bluetooth-enabled devices.

DESCRIPTION OF THE DRAWINGS

One or more embodiments will hereinafter be described in conjunction with the following drawing figures, wherein like numerals denote like elements, and wherein.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Embodiments of the present disclosure are generally directed to improved methods for prioritizing and routing audio signals between consumer electronic devices using wireless or wired communication standards, such as Bluetooth, Wi-Fi, and USB. In one exemplary embodiment of the present disclosure, a method is provided wherein a user can prioritize a preferred consumer electronic device ordering, such that when two or more connectivity technology-enabled devices are present for connecting with a "hub" device (such as a mobile phone, by way of one non-limiting example), the device having the highest priority in the device ordering is provided the audio signal in preference to the other device that has a lower ordering priority. The provided method also allows for the user to override the priority at anytime. In another exemplary embodiment, the foregoing method may be extended into the context of in-vehicle use. Using the information and entertainment ("infotainment") center of the vehicle, the vehicle may send a query to the hub device to determine which consumer electronic devices are available for connecting with the hub device. The infotainment center may then present the user with a listing of the available devices for the user's selection. The foregoing exemplary methods are provided to prioritize and route audio signals in a manner that reduces user confusion in situations wherein multiple consumer electronic devices may be connected with a hub device using the Bluetooth standard.

Bluetooth Standard

A brief overview of the Bluetooth standard and device connecting protocols, including an exemplary use thereof in connection with a vehicle, are provided prior to discussing the exemplary embodiments of the disclosure. It is well-known in the art that there are many scenarios in which it is desirable for two or more electronic devices to wirelessly communicate with each other. One common, non-limiting scenario is where a person has a mobile phone or other electronic device which she wants to use in her vehicle. In the case of the mobile phone, it is advantageous for the user to integrate the mobile phone with the embedded systems in the vehicle, such as the speakers and microphone, which are included as part of the vehicle's information and entertainment systems. This integration allows the mobile phone to be operated in a hands-free mode while in the vehicle. Many vehicle manufacturers now include Bluetooth capabilities in their vehicles, specifically for this purpose.

Bluetooth is an open, secure protocol for wirelessly exchanging data over short distances from fixed and mobile devices. Bluetooth uses radio frequency (RF) technology at 2.4 gigahertz or GHz (2.4×109 cycle/sec), to wirelessly communicate between two or more devices, at a gross data rate of up to 1 mega-bit per second (Mb/s). Bluetooth provides a way to connect and exchange information between devices, such as mobile phones, computers, vehicle communication and entertainment systems, printers, Global Positioning System (GPS) receivers, digital cameras, and video game consoles, by way of example. When a device is said to be Bluetooth enabled, it means that device includes a small computer chip that contains the Bluetooth radio and software that enables that device to connect to other devices wirelessly using Bluetooth technology.

Figure 1:
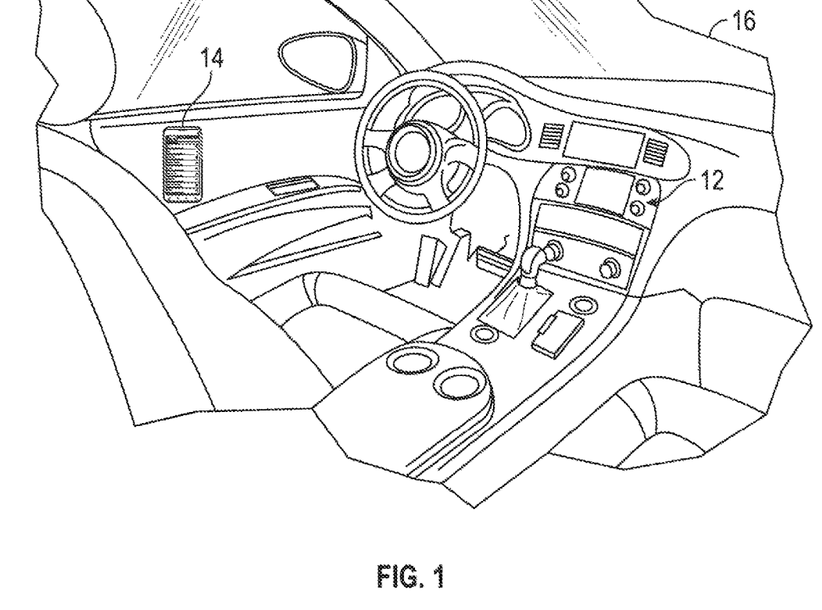
FIG. 1 is a partial interior view of a Bluetooth-enabled vehicle.

FIG. 1 is a partial inside view of a vehicle 16 showing an infotainment center 14 including an electronic display. In order for a user (such as the driver) to connect an electronic device 14, such as a mobile phone, to the vehicle 16, the driver must activate the vehicle's Bluetooth functionality. A common factor in all of the vehicle-device connecting systems and methods is that the vehicle's Bluetooth-enabled device, by default, is in a silent mode. This means that the vehicle's Bluetooth device will not accept any connecting request, regardless of whether another Bluetooth device is transmitting a proper encryption key. The silent mode, also known as non-discovery mode, is used by design to prevent unwanted or unauthorized connecting attempts, or even malicious hacking attempts. Some trigger is needed to cause the vehicle's embedded Bluetooth system to temporarily switch to a discovery mode, where Bluetooth connecting requests may be accepted.

Figure 2:
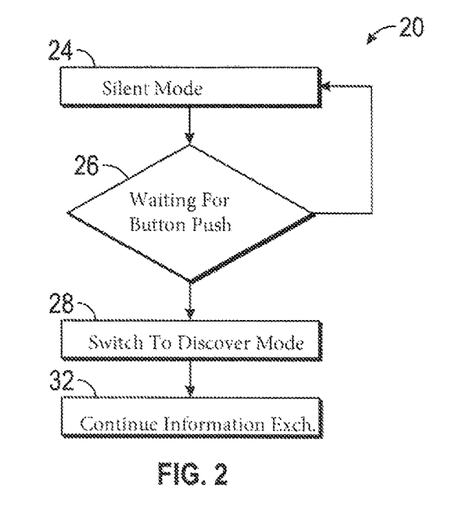
FIG. 2 is a flow chart diagram showing a process for connecting Bluetooth devices.
Figure 3:
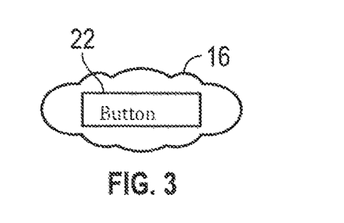
FIG. 3 is an illustration of a Bluetooth button on a vehicle used in the process of FIG. 2.

FIG. 2 is a flow chart diagram 20 showing a process for connecting Bluetooth devices. In this embodiment, the triggering mechanism is a button in the vehicle 16 which the driver or user would push. FIG. 3 shows a cut-away view of the vehicle 16 including a button 22 for triggering the connecting process, as discussed. The process begins with the vehicle's Bluetooth device in a silent or non-discovery mode at box 24. The process waits at decision diamond 26 for the button 22 to be pushed. Until the button 22 is pushed, the process remains in the non-discovery mode at the box 24. If the driver pushes the button 22 to initiate the Bluetooth connecting process, the process switches to a discovery mode at box 28. This allows the device 14 to read the vehicle's Bluetooth encryption data, including a passkey and a Bluetooth device address, and begin transmitting the encryption data in an attempt to connect with the vehicle's embedded device. With the vehicle's Bluetooth system in the discovery mode as a result of the push of the button 22, the system will receive the transmission from the device 14. The process will then proceed to box 32 where it will continue the information exchange and authentication with the device 14, per the standard Bluetooth connecting process. The connecting process will be completed with no further action required by the user of the device 14.

In accordance with further embodiments of the present disclosure, other connectivity technologies, besides the Bluetooth standard, may be used as well. These include, but are not limited to, USB and Wi-Fi standards, for example. As such, the embodiments described herein are equally applicable to both wireless and wired connectivity technologies.

Device Prioritization

Figure 4:
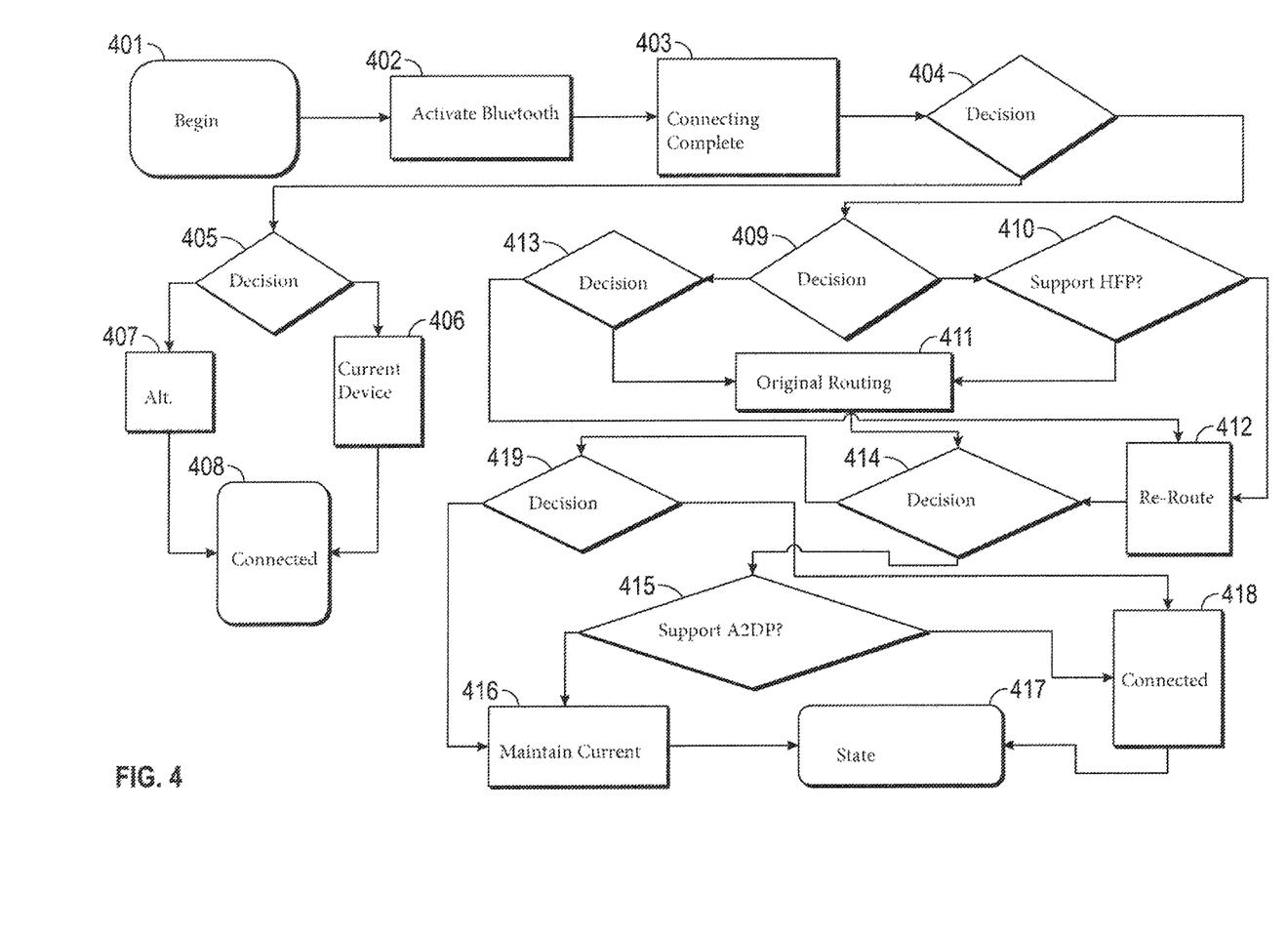
FIG. 4 is a flowchart that illustrates an exemplary method for the prioritization and ordering of consumer electronic devices in connection with the provision of audio signals thereto.

With a brief overview of the Bluetooth standard (and exemplary operation thereof in connection with a vehicle) having been presented, attention is now drawn to one exemplary method in accordance with the present disclosure, which is presented in connection with FIG. 4. FIG. 4 illustrates an embodiment using the Bluetooth standard. However, it will be appreciated that the steps shown in the flowchart may be applicable to other wireless or wired connectivity technologies as well, such as WiFi or USB. More particularly, FIG. 4 is a flowchart that illustrates an exemplary method for the prioritization and ordering of consumer electronic devices in connection with the provision of audio signals thereto. The method begins at step 401, wherein it is assumed that a Bluetooth-enabled hub device (which in some non-limiting examples may be a mobile phone) comes into proximity with two or more Bluetooth enabled consumer electronic devices that are capable of connecting with the hub device. Using the illustrative example shown in FIGS. 1-3, above, this situation may occur when the user enters a vehicle with a mobile phone and a headset or headphones, for example. Turning to step 402, the user activates the Bluetooth functionality of the consumer electronic devices. Using the example of a vehicle, the user may enable to Bluetooth functionality of the vehicle, as described above, for connection with the user's mobile phone. The headphones or headset may have already been connected to the user's mobile phone. At step 403, the connecting is completed between the hub and all consumer electronic devices present, such as the vehicle and the headphones or headset.

Figure 5:
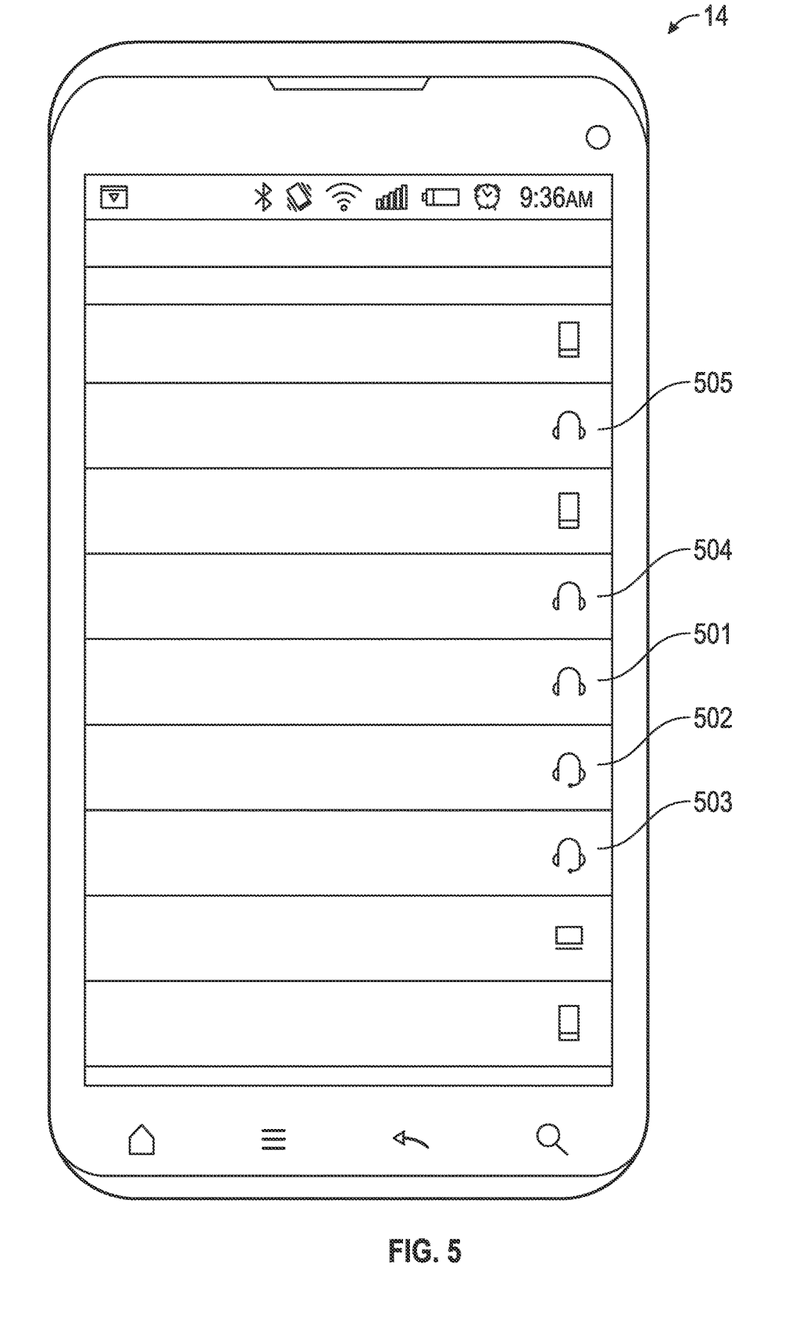
FIG. 5 is an exemplary consumer electronic "hub" device illustrating the prioritization and ordering of connected consumer electronic devices.

At decision diamond 404, a determination is made whether a "global" or a "profile" priority is assigned at the hub device. Beginning with the example of a global priority, consumer electronic devices are assigned a numerical priority at the hub device. Turning briefly to FIG. 5, and with further reference to the example wherein the mobile phone 14 serves as the hub device, the "Bluetooth Settings" feature thereof may enable the user to assign a numerical priority to a plurality of Bluetooth enabled devices. As shown in FIG.

5, "Priority 1" (501) is assigned to the "MyLink™" device, which is a vehicle infotainment functionality found in vehicle manufactured by General Motors Corp. Thus, the user has assigned top priority to the vehicle. Priorities 2 through 5 (502-505) are given to "Motorola H15", "MINI30347", "Nissan Connect", and "Sync", respectively. Of course, more of fewer priorities, to more or fewer devices, may be assigned.

Returning to FIG. 4, a decision is made whether there is a higher priority device present than the connected device that currently has the audio signal routed thereto (for example, a headset, prior to the user's entry into the vehicle), at diamond 405. When there is no higher priority device present, at step 406, the method maintains the audio routing to the current device (for example, the headset). When there is a higher priority device present, for example if the user has entered the vehicle and has assigned the vehicle a higher priority that the headset (see FIG. 5), then the method re-routes the audio signal to the vehicle. Thus, at step 408, both consumer electronic devices are connected with the hub, and the final audio routing state has been determined.

Returning to decision diamond 404, if the "profile" priority is assigned, the method continues to decision diamond 409, which determines whether both of the consumer electronic devices support the "Hands Free Profile" (HFP). As is known in the art, the Bluetooth HFP depends on the on the Generic Access Profile (GAP) and the Serial Port Profile (SPP). HPF defines the requirements for using a mobile device, such as a cellular phone, in conjunction with a hands-free device over a Bluetooth link. The mobile device acts as the audio gateway (AG) for input and output audio and the hands-free device provides the audio input and output mechanism for the AG and controls it through AT commands. If, at diamond 409, the decision is determined to be no, then at diamond 410, it is determined whether at least one of the devices (such as the newly connected vehicle, in the example presented above) support HFP. If not, then the original routing (such as to the headset) is maintained at step 411. If so, then the method re-routes the audio to the HFP-supporting device at step 412.

If, in the alternative, at diamond 409 it is determined that both devices support HFP, then the previously discussed global priority controls, and a decision is made, based on highest priority, to maintain the current audio routing (step 411) or to re-route the audio if a higher-priority device is present (step 412).

A further "profile" priority may include the use of the "Advanced Audio Distribution Profile" (A2DP). As is known in the art, the A2DP defines how multimedia audio can be streamed from one device to another over a Bluetooth connection. For example, music can be streamed from a mobile phone, to a wireless headset, hearing aid and cochlear implant streamer, car audio, or from a laptop/desktop to a wireless headset. A2DP is designed to transfer a uni-directional 2-channel stereo audio stream, like music from an MP3 player, to a headset or car radio. If, at diamond 414, the decision is determined to be no, then at diamond 415, it is determined whether at least one of the devices (such as the newly connected vehicle, in the example presented above) support A2DP. If not, then the original routing (such as to the headset) is maintained at step 416. If so, then the method re-routes the audio to the A2DP-supporting device at step 418. In general, the present disclosure will be appreciated as equally applicable in this regard to in-vehicle systems, mobile phones, MP3 music players, laptop computers, gaming systems, digital cameras, smart watches, smart glasses and eyepieces, connectible medical devices, and other wearable electronic devices.

If, in the alternative, at diamond 414 it is determined that both devices support A2DP, then the previously discussed global priority controls, and a decision is made, based on highest priority, to maintain the current audio routing (step 416) or to re-route the audio if a higher-priority device is present (step 418). Thus, at step 418, both consumer electronic devices are connected with the hub, and the final audio routing state has been determined.

Information and Entertainment ("Infotainment") System

As initially noted above, in another exemplary embodiment, the foregoing method may be extended into the context of in-vehicle use. Using the information and entertainment ("infotainment") center of the vehicle, the vehicle may send a query to the hub device to determine which consumer electronic devices are available for connecting with the hub device. The infotainment center may then present the user with a listing of the available devices for the user's selection. Thus, prior to the discussion of this embodiment, a brief overview of an exemplary vehicle infotainment system is provided.

Vehicles, including, cars and trucks, have long included entertainment systems. In particular, vehicles have long included radio tuners, compact disk players, video players, and other means of delivering audio entertainment to passengers. Either a knob or buttons on the steering wheel typically control the volume of entertainment systems. An automotive navigation system is a satellite navigation system designed for use in vehicles. A navigation system typically uses a global positioning system (GPS) navigation device to acquire position data to locate the vehicle on a road in the unit's map database. Using the map database, the unit can give directions to other locations along roads also in its database. In some vehicles, the entertainment system is coupled to the navigation system. This allows the navigation system to provide audio direction prompts ("prompts") to the passengers utilizing the speakers coupled to the entertainment system. A system having both entertainment and navigation capabilities shall be referred to herein as an "infotainment" system.

Figure 6:
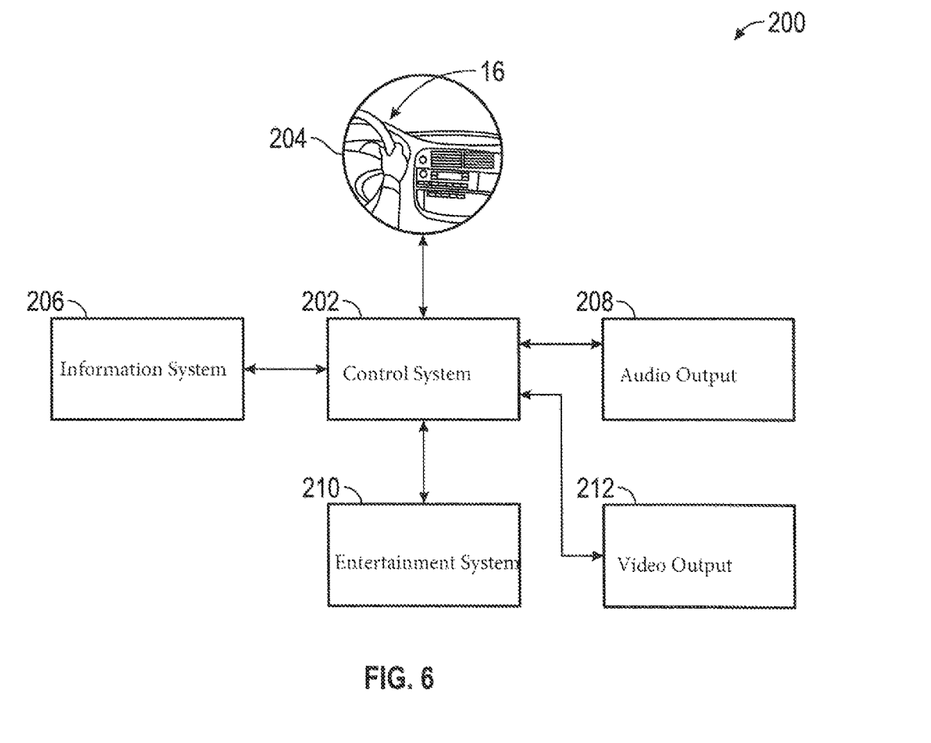
FIG. 6 is presents and exemplary vehicle information and entertainment system architecture suitable for use in connection with some embodiments of the present disclosure.

In accordance with an exemplary embodiment, FIG. 6 schematically illustrates the exemplary infotainment system 200, which may be utilized, for example, in the vehicle 16. While the following discussion is based on implementation in an automobile, the teachings herein may be applied in other contexts. For example, the infotainment system could be utilized on a motorcycle, all-terrain vehicle, or in a home entertainment system.

The infotainment system 200 (also referred to generally herein as "system") may include an infotainment control system 202. The control system 202 receives inputs from various sources and controls access to the audio output device(s) 208. In one embodiment, audio output device(s) 208 may include speakers. In other embodiments, other audio output device(s) 208 may be provided.

The control system 202 may receive input signals from an information system 206. The information system 206 may include, but is not limited to, a navigation system such as a GPS chipset component, a personal digital assistant (PDA), a radio tuner, a cellular telephone, an Internet connection, a microphone, or any other device capable of providing information to the control system 202.

The control system 202 may also receive input signals from an entertainment system 210. The entertainment system 210 may include, but is not limited to, one or more of a compact disk (CD) player, a radio tuner, a digital video disk (DVD) player, a portable media player, or other now available or later created devices that provide entertainment.

In order for the information or entertainment provided by the information source 206 or entertainment system 210 to be experienced by a passenger, the control system 202 provides the information or entertainment to one or both of the audio output 208 or video output 212. The audio output 208 may be a system of one or more speakers and the video output 212 may be, for example, one or more display screens located at one or more locations in the vehicle.

Typically, a user may control some or all of the infotainment system 200 through a user input device 204. Based on inputs received from the user input device 204, the control system 202 may determine the device that has access to one or both of the outputs 208 and 212 and a volume level for at least the audio output 208. The activation of the Bluetooth or other connectivity functionality (see FIG. 3) may also be controlled through an appropriate button 22 on the vehicle infotainment system 200.

Choosing Device Through Vehicle Infotainment System

Figure 7:
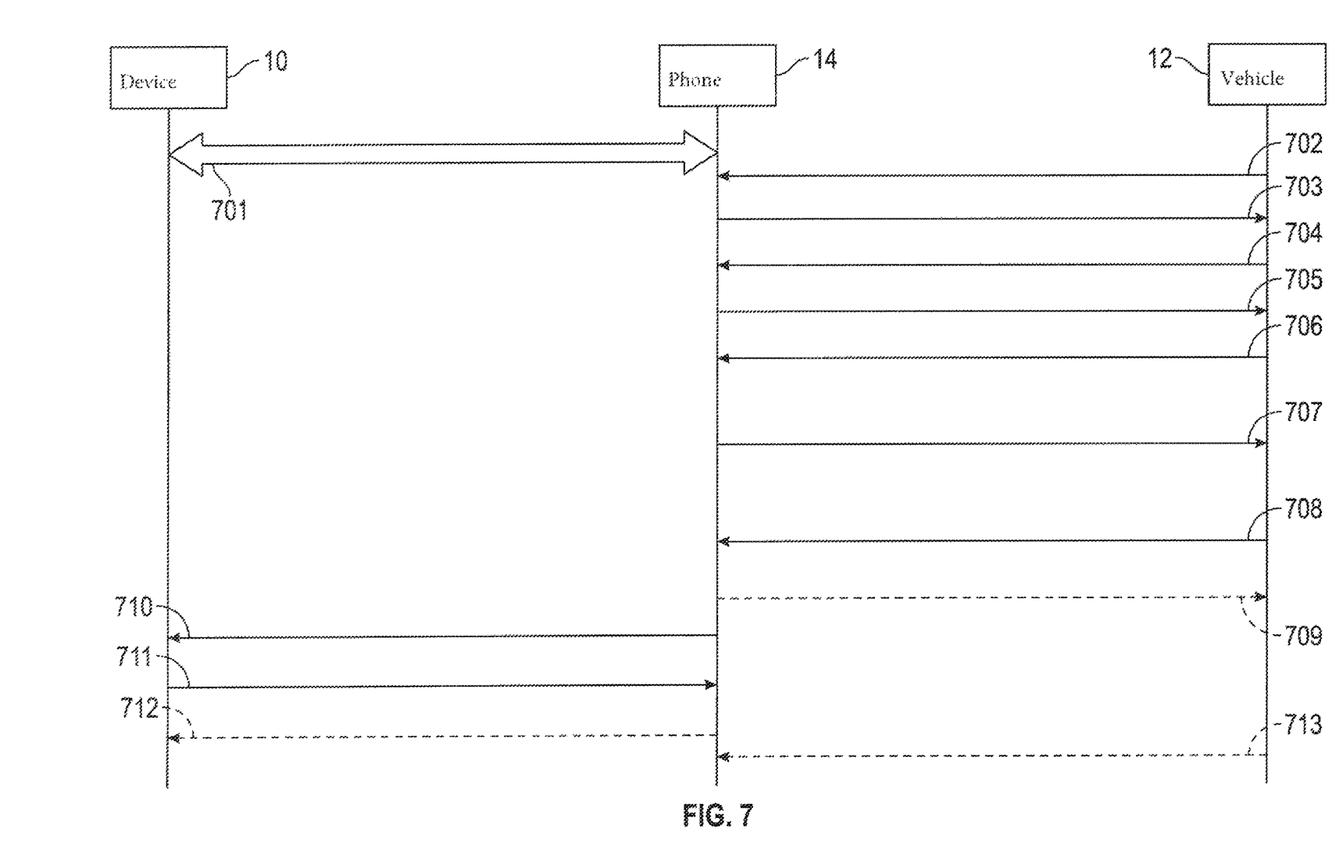
FIG. 7 is an exemplary timeline/flowchart describing a method for using a vehicle infotainment system, as in FIG. 6, for selecting a consumer electronic device to which to provide an audio signal.

Using the information and entertainment ("infotainment") center of the vehicle, the vehicle may send a query to the hub device to determine which consumer electronic devices are available for connecting with the hub device. The infotainment center may then present the user with a listing of the available devices for the user's selection. FIG. 7 is an exemplary timeline/flowchart describing a method for using a vehicle infotainment system, as in FIG. 6, for selecting a consumer electronic device to which to provide an audio signal. The arrows indicate the direction of information flow, for example to or from a Bluetooth-enabled consumer electronic device 10 (or other connectivity technology-enabled device), to or from the mobile phone 14, and to or from the vehicle 12. As shown in FIG. 7, the flowchart begins with operation 701, between the device 10 and the phone 14, which is similar to step 401 of FIG. 4, wherein it is assumed that a Bluetooth-enabled hub device (which in some non-limiting examples may be a mobile phone) comes into proximity with two or more Bluetooth enabled consumer electronic devices that are capable of connecting with the hub device. Using the illustrative example shown in FIGS. 1-3, above, this situation may occur when the user enters a vehicle with a mobile phone and a headset or headphones, for example. Turning to operation 702, between the phone 14 and the vehicle 16, the user activates the Bluetooth functionality is initiated form the vehicle 12. The user may enable to Bluetooth functionality of the vehicle 12, as described above, for connection with the user's mobile phone 14. The headphones or headset may have already been connected to the user's mobile phone (701). At operation 703, between the phone 14 and the vehicle 16, the connecting is completed between the vehicle 12 and the phone 14.

Turning now to operation 704, between the phone 14 and the vehicle 12, the vehicle initiates a request to connect with all Bluetooth-enabled audio profiles saved in the phone 14. At operation 705, the phone 14 provides the available audio profiles to the vehicle 12. Then, at operation 706, again between the phone 14 and the vehicle 12, the vehicle initiates a query to determine the available audio device for which it has received profiles. At operation 707, the phone 14 returns an available audio device list, containing m<N+1 connected devices, including the vehicle 12 and the device 10.

Figure 8:
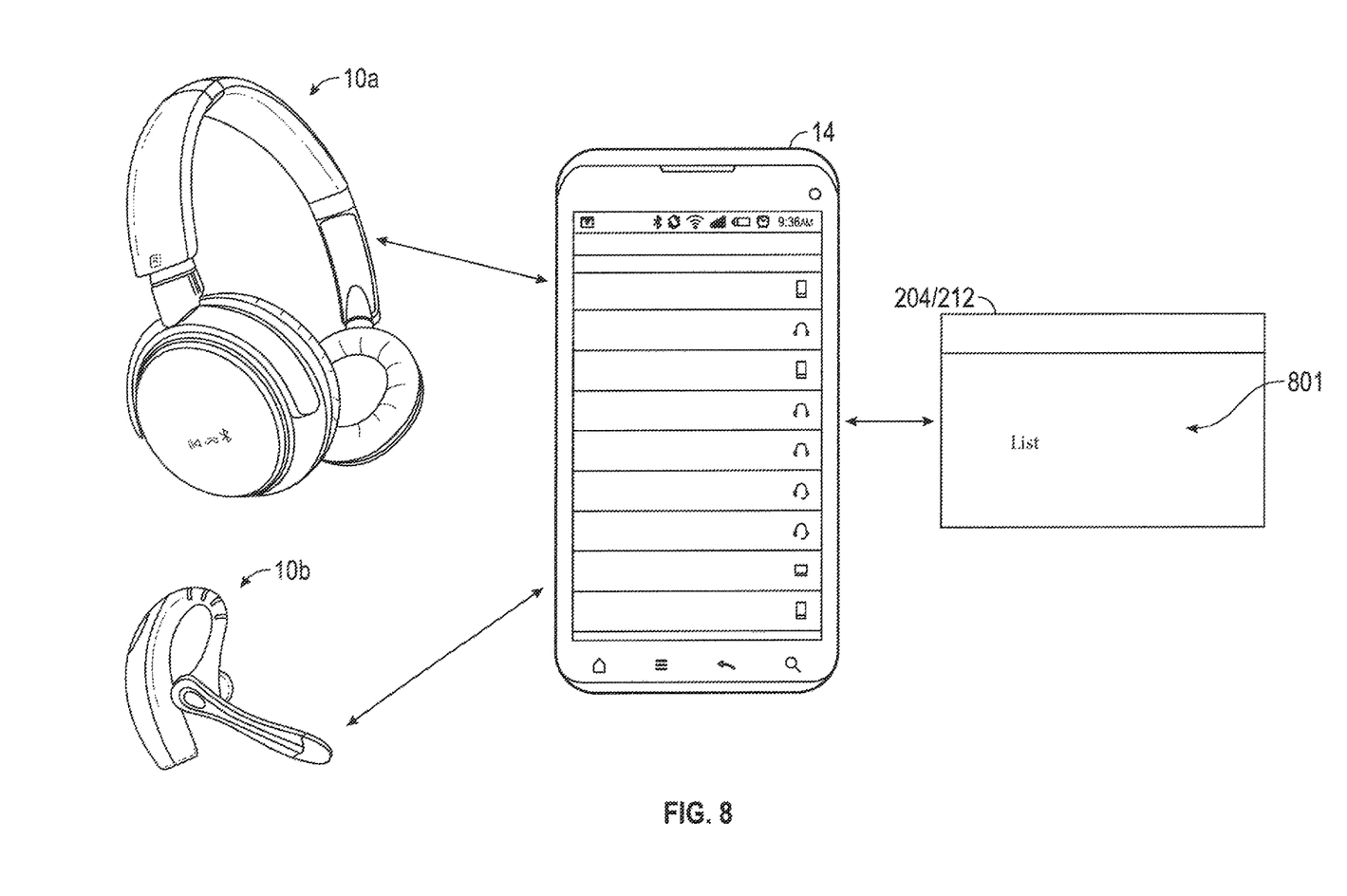
FIG. 8 is an exemplary system architecture suitable for use in connection with the method shown in FIG. 7.

At this point in the method, vehicle will display the list via the infotainment system 200 to the user (for example using video output device 212), and the user will return a selection via the infotainment system 200 of the desired device n (for example using input device 204) to which to provide the audio signal from the hub device (i.e., mobile phone 14). FIG. 8 is an exemplary system architecture suitable for use in connection with the method shown in FIG. 7. As shown therein, a list 801 is provided in the output device 212, which also functions as input device 204. The selection is provided to the mobile phone 14, which in turn is also connected with two consumer electronic devices 10a and 10b, namely headphones and a headset, respectively.

Returning back to the timeline/flowchart in FIG. 7, between the phone 14 and the vehicle 12, the vehicle notifies the phone 14 of the user's active audio device selection, at operation 708. Optionally, at operation 709, the phone 14 may send an acknowledgement signal to the vehicle 12, acknowledging receipt of the user's selection.

Continuing to operation 710, between the mobile phone 14 and the device 10, if the user's selection differs from the current device selection, the currently selected device 10 is released, and the device 10 acknowledges its release at operation 711. At operation 712, optionally, a new connected device is notified that it is the active device. Further, optionally, at operation 713, if the user selected the vehicle to be the active device, between the phone 14 and the vehicle 12, a communication takes place indicating that the vehicle is configured as the active device.

Accordingly, the present disclosure has provided various exemplary methods are that prioritize and route audio signals in a manner that reduces user confusion in situations wherein multiple consumer electronic devices may be connected with a hub device using the Bluetooth standard, the WiFi standard, the USB standard, or another suitable wireless or wired connectivity standard.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather than, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for prioritizing and routing audio signals between consumer electronic devices comprising:

receiving, at a mobile telephone device, a device prioritization designation for at least two additional connectivity technology-enabled devices, wherein the prioritization designation designates a first of the at least two additional connectivity technology-enabled devices as having a higher priority than a second of the at least two additional connectivity technology-enabled devices;

at a first location, wherein the mobile telephone device is in wireless communications range of the second of the at least two additional connectivity technology-enabled devices but not within wireless communications range of the first of the at least two additional connectivity technology-enabled device, automatically and without user input connecting the mobile telephone device with the second of the at least two additional connectivity technology-enabled devices, while not connecting to the first of the at least two additional connectivity technology-enabled devices, and providing an audio signal to the second of the at least two additional connectivity technology-enabled devices such that the audio signal is emitted as sound from the second of the at least two additional connectivity technology-enabled devices;

after connecting with and providing the audio signal to the second of the at least two additional connectivity technology-enabled devices, and at a second location that is different from the first location, wherein at the second location the mobile telephone device is in wireless communications range of both the first and the second of the at least two additional connectivity technology-enabled devices and wherein the second location comprises a vehicle having a vehicle information and entertainment (infotainment) system, automatically and without user input further connecting the mobile telephone device with the first of the at least two additional connectivity technology-enabled devices while remaining connected to the second of the at least two additional connectivity technology-enabled devices, and automatically and without user input providing the audio signal to the first of the at least two additional connectivity technology-enabled devices such that the audio signal is emitted as sound from the first of the at least two additional connectivity technology-enabled devices while discontinuing providing the audio signal to the second of the at least two additional connectivity technology-enabled devices;

at the vehicle infotainment system, automatically and without user input requesting and receiving from the mobile telephone device a list of all currently available connectivity technology-enabled devices that are within wireless communications range of the mobile telephone device, the list of all currently available connectivity technology-enabled devices including the at least two additional connectivity technology enabled devices;

at the vehicle infotainment system, automatically and without user input displaying the list of all currently available connectivity technology-enabled devices;

at the vehicle infotainment system, receiving a user selection of a connectivity technology-enabled device from the list of all currently available connectivity technology-enabled devices that is different from the first of the at least two additional connectivity technology-enabled devices;

at the vehicle infotainment system, automatically and without user input in response to the user selection, sending an electronic message to the mobile telephone device indicating the user-selected connectivity technology enabled device; and at the mobile telephone device, automatically and without user input providing the audio signal to the user-selected connectivity technology-enabled device such that the audio signal is emitted as sound from the user-selected connectivity technology-enabled device while discontinuing providing the audio signal to the first of the at least two additional connectivity technology-enabled devices.

2. The method of claim 1, wherein the at least two additional connectivity technology-enabled devices comprise Bluetooth-enabled devices.

3. The method of claim 1, wherein the at least two additional connectivity technology-enabled devices comprise USB-enabled devices.

4. The method of claim 1, wherein the at least two additional connectivity technology-enabled devices comprise WiFi-enabled devices.

5. The method of claim 1, wherein the at least two additional connectivity technology-enabled devices are independently chosen from in-vehicle systems, MP3 music players, laptop computers, gaming systems, digital cameras, smart watches, smart glasses and eyepieces, connectible medical devices, and other wearable electronic devices.

6. The method of claim 1, wherein the first of the at least two additional connectivity technology-enabled devices comprises an in-vehicle information and entertainment ("infotainment") system.

7. The method of claim 6, wherein the second of the at least two additional connectivity technology-enabled devices comprises a wearable electronic headset.

8. A method for prioritizing and routing audio signals between consumer electronic devices comprising:

receiving, at a mobile telephone device, a device prioritization designation for at least two additional connectivity technology-enabled devices, wherein the prioritization designation designates a first of the at least two additional connectivity technology-enabled devices as having a higher priority than a second of the at least two additional connectivity technology-enabled devices;

at a location wherein the mobile telephone device is in wireless communications range of both the first and the second of the at least two additional connectivity technology-enabled devices and wherein the location comprises a vehicle having a vehicle information and entertainment (infotainment) system, automatically and without user input connecting the mobile telephone device with the first of the at least two additional connectivity technology-enabled devices, while not connecting to the second of the at least two additional connectivity technology-enabled devices, and automatically and without user input providing an audio signal to the first of the at least two additional connectivity technology-enabled devices such that the audio signal is emitted as sound from the first of the at least two additional connectivity technology-enabled devices;

at the vehicle infotainment system, automatically and without user input requesting and receiving from the mobile telephone device a list of all currently available connectivity technology-enabled devices, the list of all currently available connectivity technology-enabled devices including the at least two additional connectivity technology enabled devices;

at the vehicle infotainment system, automatically and without user input displaying the list of all currently available connectivity technology-enabled devices;

at the vehicle infotainment system, receiving a user selection of a connectivity technology-enabled device from the list of all currently available connectivity technology-enabled devices that is different from the first of the at least two additional connectivity technology-enabled devices;

at the vehicle infotainment system, automatically and without user input in response to the user selection, sending an electronic message to the mobile telephone device indicating the user-selected connectivity technology enabled device; and at the mobile telephone device, automatically and without user input providing the audio signal to the user-selected connectivity technology-enabled device such that the audio signal is emitted as sound from the user-selected connectivity technology-enabled device while discontinuing providing the audio signal to the first of the at least two additional connectivity technology-enabled devices.

9. The method of claim 8, wherein the user-selected connectivity technology-enabled device comprises the second of the at least two additional connectivity technology-enabled devices.

10. The method of claim 9, wherein the first of the at least two additional connectivity technology-enabled devices comprises an in-vehicle information and entertainment ("infotainment") system.

11. The method of claim 10, wherein second of the at least two additional connectivity technology-enabled devices is chosen from MP3 music players, laptop computers, gaming systems, digital cameras, smart watches, smart glasses and eyepieces, connectible medical devices, and other wearable electronic devices.

12. The method of claim 11, wherein the at least two additional connectivity technology-enabled devices comprise Bluetooth-enabled devices.

* * * * *